United States Patent [19]
Etoh et al.

[11] Patent Number: 5,798,315
[45] Date of Patent: Aug. 25, 1998

[54] MICROCAPSULE-CONTAINING OIL-BASED COATING LIQUID, INK, COATED SHEET, AND METHOD OF PREPARING THE SAME

[75] Inventors: Kei Etoh; Akira Hirasawa; Hisano Higurashi; Makoto Kawamura, all of Tokyo, Japan

[73] Assignee: Toppan Moore Co., Ltd., Tokyo, Japan

[21] Appl. No.: 797,452

[22] Filed: Feb. 6, 1997

Related U.S. Application Data

[62] Division of Ser. No. 413,690, Mar. 30, 1995, Pat. No. 5,646,203.

[30] Foreign Application Priority Data

| Mar. 31, 1994 | [JP] | Japan | 6-85978 |
| Jul. 29, 1994 | [JP] | Japan | 6-209029 |
| Jul. 29, 1994 | [JP] | Japan | 6-209030 |

[51] Int. Cl.$^6$ ................................ B41M 5/165
[52] U.S. Cl. ............ 503/215; 428/321.5; 503/206; 503/213; 503/214; 503/226
[58] Field of Search ................ 427/150–152; 428/321.5, 195, 327, 913, 914; 503/214, 215, 206, 213, 226

[56] References Cited

U.S. PATENT DOCUMENTS

| 4,936,916 | 6/1990 | Shinmitsu et al. | 106/21 |
| 4,985,484 | 1/1991 | Yoshida et al. | 524/379 |
| 5,084,492 | 1/1992 | Pinell et al. | 523/161 |
| 5,120,360 | 6/1992 | Tajiri et al. | 106/21 |

FOREIGN PATENT DOCUMENTS

| 0149557 | 7/1985 | European Pat. Off. | 503/215 |
| 0385718 | 9/1990 | European Pat. Off. | 503/215 |
| 6016571 | 2/1981 | Japan | 503/215 |
| 58191771 | 9/1983 | Japan | 503/215 |
| 3183974 | 7/1988 | Japan | 503/215 |
| 1581757 | 12/1980 | United Kingdom | 503/215 |
| 2187486 | 9/1987 | United Kingdom | 503/215 |
| WO9220465 | 11/1992 | WIPO | 503/215 |
| WO9409991 | 5/1994 | WIPO | 503/215 |

*Primary Examiner*—Bruce H. Hess
*Attorney, Agent, or Firm*—Weingarten, Schurgin, Gagnebin & Hayes LLP

[57] ABSTRACT

A microcapsule-containing oil-based coating liquid wherein the coating liquid comprises a hydrophobic core material-containing microcapsule particles dispersed individually in a state of primary particle in an oil varnish for ink use or a resin for coating use, and a solvent having an affinity for both the varnish or the resin and the surface of the microcapsule wall material in a state of having been attracted with the affinity to both the varnish or the resin and the surface layer of the microcapsule wall material. The preferred solvent is a lower divalent or multivalent alcohol.

A preparative method of the foregoing coating liquid by utilizing vacuum distillation is also proposed.

A sheet, like a duplicating sheet of paper coated with the foregoing oil-based coating liquid is further provided.

According to the present invention, a water-based microcapsules system can be advantageously converted into an oil-based one without coagulating the primary microcapsule particles. There is no hardening and breakdown of the wall material during the process, and the original strength and the flexibility of the microcapsule wall material can be retained intact. Conventional pressure transferring-type printing machine may be employed to printing a selected area of the sheet.

4 Claims, 4 Drawing Sheets

MICROCAPSULE-CONTAINING OIL-BASED COATING LIQUID, INK, COATED SHEET, AND METHOD OF PREPARING THE SAME

This application is a division of application Ser. No. 08/413,690, filed Mar. 30, 1995, now U.S. Pat. No. 5,646,203.

BACKGROUND OF THE INVENTION

1. Field of the Invention

The present invention relates to a method of converting a microcapsule-containing water-based dispersion into a microcapsule-containing oil-based ink or oil-based coating liquid without coagulating the individually dispersed primary microcapsule particles.

More precisely, the method comprises blending a microcapsule-containing aqueous dispersion with a solvent such as glycerine which has an affinity for both a varnish for printing use or a resin for coating use, and the surface of the microcapsule wall material, and with an oil-based coating liquid comprising the foregoing oil varnish or resin, and removing the water present in the resulting mixture by vacuum distillation to convert the microcapsules in a water-based dispersion into those in an oil-based system without coagulating the primary dispersed microcapsules in order to obtain a microcapsule-containing oil-based coating liquid.

Examples of the foregoing oil-based coating liquid comprising an oil varnish for ink use or a resin for coating use include methacrylic derivatives, acrylic derivatives, mixed glycerides of an unsaturated fatty acid, and the like.

The present invention further relates to a sheet, in particular to a pressure-sensitive printing sheet of paper (noncarbon-type duplicating printing paper or so-called "carbonless paper") with a coating layer comprising a microcapsule-containing oil-based ink on a selected area of the printing sheet of paper, synthetic paper or plastic film, and to a method of preparing the same.

2. Background Art

Methods for preparing microcapsules are now applied in many industrial areas for encapsulating materials, such as dye, perfume, liquid crystal, pigment, solvent, adhesives to make these core materials easier to handle and to maintain their performance for a long period of time. These core materials are usually encapsulated in a water-based system; therefore, microcapsules in such a water-based system are very difficult to convert directly into an oil varnish or a resin-based coating liquid.

If a microcapsule-containing water-based dispersion could be directly converted into an oil-based one, such a process or an oil-based dispersion thus obtained could be applied for various kinds of fields such as roll milling of plastics such as polyvinyl chloride. Particularly, in the printing field, especially in a field of preparing pressure sensitive duplicating sheets, a special desensitizing printing ink capable of preventing coloring has hitherto been coated on a selected area of the sheet for making a carbonless sheet of paper or self-coloring sheets; however, in this case, when a color former core microcapsule-containing oil-based printing ink is used, direct printing for a selected area on the printing sheet will be possible preferably, even on a sheet of thin paper, sandwiched paper, or synthetic paper, these papers having never been printed before, as well as fine paper by utilizing the conventional desensitizing printing unit untouched.

Conventional microcapsulation of dye has been carried out in a water-based system; therefore, the resulting dye core microcapsule-containing ink is of a water-based composition, and has been limited in its uses. When a carbonless sheet of paper is made by coating a selected area of the sheet by flexographic printing with a color-developing dye core microcapsule-containing water-based coating liquid, the coating layer shrinks upon drying and sometimes causes wrinkles around the printed area because of a necessity of drying; therefore, such a water-based coating layer is difficult to apply freely. Such problems associated with the use of a microcapsule-containing water-based material have usually been circumvented by coating the entire surface with the layer of a color former by means of an air knife, and thereafter, applying a desensitizing ink on the unnecessary areas in order to prevent coloring. This is obviously tedious. In addition, when the amount of the desensitizing ink is insufficient and the printing is uneven, coloring takes place due to the inefficient preventing effect, showing that a large excess of desensitizing ink is necessary. Owing to the higher tack and lower flow of the desensitizing ink comparing with other conventional ink, it becomes necessary for a specifically designed unit to increase the amount of the desensitizing ink to be printed or the printing speed needs to be lowered, indicating higher operating costs and lower productivity. Further, the amount of microcapsule-containing water-based ink to be coated is usually limited to the range wherein curling of the sheet does not take place.

On the other hand, when a plastic sheet is printed with such a microcapsule-containing water-based coating liquid, setting properties of the coating (i.e. fixing, curing, etc) becomes unsatisfactory, showing that plastic sheets can not be employed for such a purpose. A sheet of art paper, coat paper, gravure paper, synthetic paper, thin paper, or sandwiched paper likewise has been found to be actually difficult to use for making an upper printing or intermediate printing sheet of a carbonless sheet of paper.

In order to circumvent these problems, a process has been practiced, wherein dried microcapsule powder with good flowability is milled into an oil varnish or a resin for coating use after a microcapsule-containing water-based dispersion is subjected to a conventional spray drying to obtain the dried microcapsule powder, because a microcapsule-containing water-based dispersion cannot be converted directly into an oil-based varnish for printing ink use.

In this spray drying process, however, it becomes necessary to increase the amount of ink to disperse the powdered microcapsules to obtain ink of suitable flowability. As a result, it is difficult to achieve high concentrations of microcapsules, indicating a problem of insufficient coloring of the resulting print. Besides, the primary microcapsule particles are sometimes converted into secondary particles by coagulation upon spray drying in the presence of a dried emulsifying agent derived from and used in the original polymerization system for preparing the microcapsule wall. A dried solid film of the emulsifying agent covers around the surface of the secondary particles. Because of this wrapping, the particle size of the coagulated secondary particles increases by a factor of, for example, from several to several 10, unpreferably. These large secondary particles have to be subjected to crushing to provide particles with a suitable average particle size of less than 2 μm, preferably less than 1 μm in order to obtain suitable printability. Further, the microcapsule wall material becomes brittle by hardening upon spray drying and the walls of the secondary particles are broken down with ease upon the crushing. As a result, when a carbonless sheet of intermediate paper coated with a color developing dye on the back and a developer on the surface is made, the color developing dye of the core material freed from encapsulation penetrates into the fiber matrix of the paper while causing coloring of the surface which has been coated with the developer unpreferably.

In such a process, in addition to high costs due to the necessity of installing a spray dryer, a blender, crushing rolls, and the like, the productivity becomes too low because a substantial amount of microcapsules is lost upon spray drying, wherein a diluted microcapsule-containing water-based dispersion, for example, a 5% dispersion has to be reluctantly employed in order to bring the particles closer to primary particles.

So-called "Flushing Process" has been practiced in the ink manufacturing industry to convert a water-based colorant into an oil-based colorant, wherein the process comprises mixing a cake-like colorant with an oil varnish, elevating the temperature to remove the supernatant water by decantation, continuing heating and vacuum distillation of the residual water to convert the water-based colorant into an oil-based one. When a colorant-containing water-based dispersion is directly employed, problems associated with solidification of the colorant, separation from the varnish, foaming upon evaporation, or bumping, and the like arise; therefore, the dehydrated cake-like colorant is usually employed after the colorant contained in the water-based dispersion is filterized and pressed.

Such a "Flushing Process" has been found to be not practical for application to the present invention, because the foregoing cake-like colorant particles consist mainly of coagulated secondary particles, and have to be further subjected to crushing by means of, for example, a crushing mill to provide it with suitable printability.

SUMMARY OF THE INVENTION

Thus, the first aspect of the present invention is directed to a method for converting directly a microcapsule-containing water-based dispersion into a microcapsule-containing oil-based coating liquid without coagulating the original primary microcapsule particles, and without impairing the elasticity and strength of the microcapsule wall material.

The second aspect of the invention is directed to a sheet and a method of making the same, wherein the selected area of the sheet has been coated freely with a layer comprising the foregoing microcapsule-containing oil-based ink by a conventional pressure transferring-type printing machine. The foregoing microcapsules have been filled with an objective material.

The further aspect of the present invention is directed to a method of making a carbonless sheet of paper, wherein the carbonless paper is made by forming a coating layer comprising a color former-containing microcapsules on a selected area paralleled to the prescribed print on the sheet of paper by a conventional pressure transferring machine, the sheet being of all kinds of paper.

A method according to the present invention comprises blending a microcapsule-containing water-based dispersion with a solvent, preferably a dihydric or polyhydric alcohol which has an affinity for both a varnish or a resin for coating use and the surface of the microcapsule wall material, in order to bind the hydrophilic group of the solvent to the surface of the microcapsule wall material with the affinity, further blending the resulting solution with the oil varnish or the resin for coating use as the main component of an oil-based ink or oil-based coating, together with auxiliary components in order to bind the microcapsules to the varnish or the resin with the affinity of the hydrophobic group of the solvent which has been bound to the surface of the microcapsule wall material, and furthermore, removing the water present in the microcapsule-containing water-based dispersion by vacuum distillation to convert the water-based dispersion into a microcapsule-containing oil-based coating liquid without coagulating the individual particles and without causing solidification, foaming, phase separation or bumping.

A sheet according to the present invention is made by a method comprising forming a coating layer comprising a microcapsule-containing oil-based ink thus obtained on a selected area of the sheet by a pressure transferring printing machine. The microcapsules, which are prepared in a water-based system, have been filled with a hydrophobic core material, such as dye, pigment, perfume, liquid crystal, a chemical agent, solvent, a plasticizer, a temperature indicating agent, or an adhesive.

A method of making a carbonless sheet of paper according to the present invention comprises forming a coating layer comprising a microcapsule-containing oil-based printing ink on a selected area of the sheet of paper by a pressure transferring printing machine, wherein the oil-based printing ink is prepared by the foregoing method of the present invention from a microcapsule-containing water-based dispersion, the microcapsules having been filled with e.g. a color former as the core material and dispersed in an oil-based vehicle for printing ink use while maintaining the properties of the microcapsules, i.e. the original elasticity and the strength of the wall material of the microcapsules.

In the present invention, a microcapsule-containing water-based system can be directly converted into a microcapsule-containing oil-based system, while maintaining the primary microcapsule particles intact without causing coagulation.

In addition, the original elasticity and strength of the microcapsule wall material can be maintained without causing hardening because no drying process is involved. There is no breakdown of the microcapsules by pressure during processing of the coating liquid. The microcapsules according to the invention are broken only when a moderate pressure is applied after being coated.

In the microcapsule-containing oil-based ink composition of the present invention, the microcapsules filled with an objective core material are dispersed in an oil vehicle for printing ink use while retaining their mechanical properties, such as elasticity and strength, of the original microcapsules produced in a water-based system; therefore, the microcapsule-containing oil-based ink according to the present invention can be handled in a similar manner with conventional UV-curable or oxidative polymerization-type oil-based printing inks. Thus, a coating layer comprising a color former core microcapsule-containing oil-based ink can be applied freely on a selected area paralleled to the prescribed print on a sheet of all kinds of printing paper by a pressure transferring printing machine.

DETAILED DESCRIPTION OF THE PREFERRED EMBODIMENTS

The invention will now be illustrated in detail below by the following Examples.

In the present invention, the hydrophobic core material is not specified but may be solid fine-grain such as dye, pigment, a temperature indicating agent, perfume, germicide, and the like, otherwise may be liquid which is good in emulsion stability, such as liquid crystal, a chemical agent, solvent, and the like. The color former according to the present invention which is used in duplicating sheet is a color developing dye or a precursor of the dye which can develop color upon contact with a developer. Examples of the dye include leuco-type dyes such as crystal violet lactone. Other examples include dyes of xanthene-type, merocyanine-type, thiazine-type, azine-type, methine-type, azo-type, pyrazoline-type, stilbene-type, coumarin-type, phenylmethane-type, or the like. Examples of the precursors of dye include diphenylmethanes, triphenylmethanes, bisphenylmethanes, xanthenes, thiazines, spiropyrans, and mixtures thereof.

In the present invention, the wall material used for preparing the microcapsules according to the present invention is not specified but may be selected from the group consisting of gelatin, polyamides, polyurethanes, polyesters, polysulfonamides, polysulfonates, polyureas, and the like. The method of making microcapsules according to the present invention may be selected from the conventional group consisting of an in site method, an interfacial polymerization, a coacervation method, an orifice method, and the like.

The microcapsule-containing water-based dispersion according to the present invention may be produced, for example, by the in site method, wherein a color developing dye as the core material is encapsulated with a wall material for microcapsules comprising a melamine or urea-formaldehyde resin made from a precondensate thereof or by reacting melamine or urea with formaldehyde in the presence of a partially hydrolyzed styrene-maleic anhydride copolymer having acid catalytic and emulsifying-dispersing functions.

The individual preparative steps will be illustrated in detail below.

(a) The step of blending an oil vanish for ink use or a resin for coating use and a solvent which has an affinity for both the surface layer of the aforesaid microcapsule wall material, and the oil vanish for ink use or the resin for coating use with a microcapsule-containing water-based dispersion:

The solvent having an affinity for both the surface of a microcapsule wall material and a vanish or a coating resin are those having both hydrophobic and hydrophilic properties. Examples of the solvent include glycerine, ethylene glycol, diethylene glycol, butanediol, propylene glycol, and the like. When the molecular weight of the solvent is too high, the compatibility with water impairs and the blending becomes difficult because of its higher viscosity. The affinity for the surface layer of the microcapsule wall material increases with the increase in number of hydrophilic groups of the solvent, considering the molecular weight; therefore, dihydric or polyhydric alcohols are preferably employed. Lower alcohols of from 2 or more carbon atoms may also be preferably used because a given number of or more of hydrophobic groups and a higher boiling point are necessary in order to be converted effectively into an oil-based system. For example, in a UV-curable-type printing ink, preferred solvents are ethylene glycol or glycerine, more preferably glycerine, because ethylene glycol and the like are raw materials for acrylic polymers, oligomers and monomers, and the compatibility of them with a UV-curable-type oil vanish comprising such an acrylic derivative is good.

In a water-based system, when a microcapsule wall material is covered with a layer of an acidic catalyst serving as an emulsifying and dispersing agent such as a partially hydrolyzed styrene-maleic anhydride copolymer, the hydrophilic groups protruding from the surface layer of the microcapsule wall material, i.e. carboxyl groups here, are bonded in water molecules by means of hydrogen bonds. However, when a solvent having both hydrophobic and hydrophilic properties is added to such a water-based dispersion, the hydrophilic groups of the solvent are bonded in the hydrophilic groups of the acidic catalyst by means of hydrogen bonds while maintaining the water layer on the microcapsule wall material; therefore, the solvent is attracted with its affinity to both the component of the oil-based ink and the surface of the microcapsule wall material via the acidic catalysts.

Taking into account the minimum amount of solvent necessary for securing the affinity for the total surface area of the microcapsules while considering the impairment of coating properties of the resulting composition in the presence of an excess amount of solvent, the preferred amount of solvent added to a microcapsule-containing water-based dispersion is between 5% and 100% by weight, preferably 20% and 85% by weight, more preferably 30% and 70% by weight, based on the total solid weight of the dispersion.

The oil varnish for printing ink use or the resin for coating use (or nonvolatile vehicle component) is a main component of an oil-based printing ink or an oil-based coating liquid, respectively. In the present invention, the water present in the intermediate composition varnish is selectively removed by vacuum distillation; therefore, the boiling point of the vanish or the resin is higher than that of water. Varnish or vehicle resins of this kind are prepared from acrylic acid by esterification or etherification in order to give at least one unsaturated bond. Examples of these vanishes include UV-curable-type unsaturated monomers or oligomers of methyl acrylate, ethyl acrylate, acrylic esters of a polyvalent alcohol, epoxy-type acrylates, urethane-type acrylates, polyester-type acrylates, polyether-type acrylates; and oxidative polymerization-type ones such as drying oil including linseed oil and tung oil of which the major components are oleic acid, linolenic acid, linoleic acid, semi-drying oil such as soybean oil, and non-drying oil such as castor oil. These oxidative polymerization-type vanishes comprise mixed glycerides of an unsaturated fatty acid.

Further, taking into account of the flexibility for producing a variety of oil-based printing inks or oil-based coating liquids, phenolic resins, polyester resins, rosin-modified phenolic resins, rosin-modified maleic resins, epoxy resins, ketone resins, urethane resins may also be employed. Examples of solvents as a diluent include toluene, xylenes, n-butyl acetate, isobutyl acetate, high-boiling aliphatic hydrocarbons such as n-paraffins, iso-paraffins, cycloparaffins, and alkylbenzenes.

In the liquid mixture, the solvent having both hydrophilic and hydrophobic properties is attracted with the affinity to both the surface of the microcapsule wall material and the varnish or the resin for coating use, i.e. the microcapsules are further attracted to the oil-based system by means of the solvent which has been attracted to the surface of the microcapsule wall material, thus resulting in the replacement from an water-based system of microcapsules to an oil-based one.

(b) The step of replacing a water-based system of microcapsules to an oil-based system by vacuum distillation of the water present in the water-based system while maintaining the microcapsules in a state of primary particles:

When glycerine (b.p.; 290° C.) is used as the solvent having an affinity for both the varnish or coating resin and the surface of the microcapsule wall material, the preferred temperature to remove the water in vacuum is within the range of from 30° to 90° C. (under about 10 Pa), preferably from 30° to 70° C. When the temperature is higher than 70° C., the oil-based coating liquid tends to separate from the mixture. The final amount of water in the mixture is adjusted to within the range of from 5 to 15% weight, preferably from 8 to 12% by weight. Glycerine is particularly suitable for use here because it has a defoaming effect to prevent the water from bumping, and has a wetting effect to prevent the formation of a dried film on the liquid surface when the water is evaporated and thereby an effective evaporation of water can be carried out.

Figure 1:
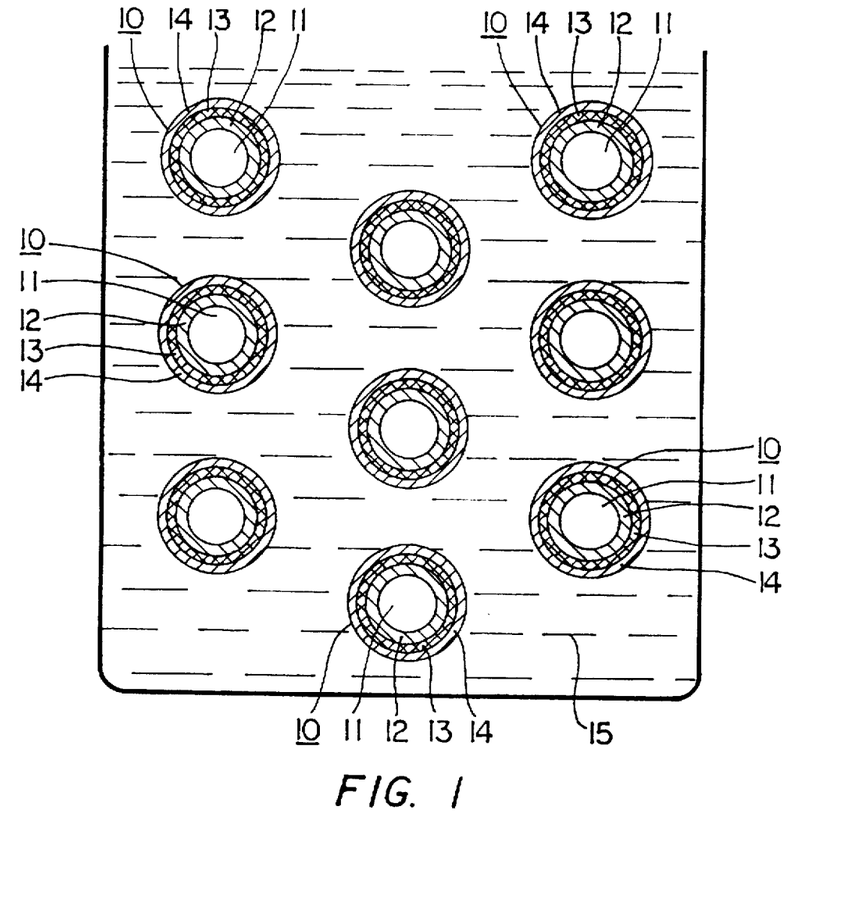
FIG. 1 is an enlarged sectional view of the microcapsule particles of the present invention, the particles being individually dispersed in an oil-based coating liquid of the present invention.

FIG. 1 shows the microcapsule-containing oil-based coating liquid thus obtained according to the present invention. A varnish 15 for printing ink use and a solvent 14 which has an affinity to both the varnish 15 and the surface layer 13 of the microcapsule wall material 12 were blended with a microcapsule-containing water-based dispersion, after which the water is removed from the mixture by distillation in vacuum, whereby individual microcapsule particles 10 filled with a color developing dye 11 in a water system is converted into a microcapsule-containing oil-based ink in a state of original primary microcapsule particles.

The method for printing a coating layer comprising the aforesaid microcapsule-containing oil-based printing ink on a selected area of a sheet by a pressure transferring printing machine will be illustrated in detail below.

The microcapsule-containing oil-based printing ink according to the present invention may be prepared in a similar manner as for conventional ink prepared by an ink mill. In this case, even when the microcapsules are pressed onto a printing body to be printed by means of a roller, the capsules may be transferred and bonded by contact onto the printing body without breakdown. When a material suitable for the doctor blade is suitably selected, the microcapsules may also be handled without breakdown in a similar manner as the conventional printing ink during the course of intaglio printing.

Various kinds of printing inks corresponding to the conventional ink including those for letterpress printing, flat sheet printing, screen printing, and the like may be prepared freely. Thus, the resulting microcapsule-containing printing ink according to the present invention has a good printability and forms a dried coating layer on a printing sheet in which the microcapsules have been bonded by contact. The printing ink according to the invention also has a suitable flow and drying characteristics. For example, owing to their flow characteristics, the printing inks are transferred with ease from an ink fountain to a vibrating roller onto which the ink is distributed easily and further transferred with ease onto a body to be printed from a printing matrix. In addition, owing to their drying characteristics, a fully dried coating layer may be obtained from the semi-solid ink without problems.

Figure 2:
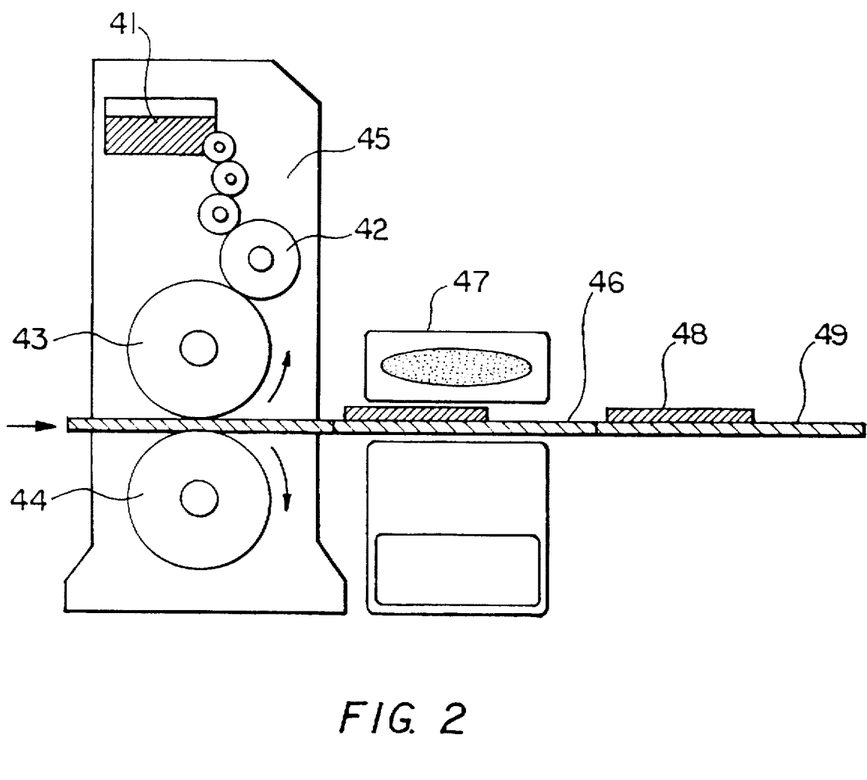
FIG. 2 is a schematic diagram of the formation of a coating layer comprising a microcapsule-containing oil-based ink of the present invention.

The formation of coating layer by printing with the microcapsule-containing oil-based printing ink will be further illustrated in detail hereinbelow in conjunction with FIG. 2.

A microcapsule-containing oil-based printing ink 41 thus prepared is printed onto a selected area of a sheet substrate 46 by a pressure transferring process, for example, a letter offset rotary press 45 of moderate speed while the amount of dried ink is regulated, whereby a printed sheet 49 partially covered with a coating layer 48 comprising of the microcapsule-containing oil-based ink can be obtained through a UV-dryer 47. Further, numeral 42 designates a plate cylinder, 43 designates a rubber blanket cylinder, and 44 designates an impression cylinder.

The microcapsule-containing oil-based printing ink according to the present invention may likewise be used in a similar manner as for conventional ink; therefore, they may also be used in many specific fields, for example, in the other printing field, such as glass printing, printing by use of elastic transferring base, cellophane printing, aluminum foil printing, printing for printed circuits and integrated circuits, and intumescent printing as well as the printing for a general printing sheet of paper, synthetic paper or plastic film.

The present invention will be further illustrated herein below in conjunction with FIG. 3 which shows a duplicating paper composed of three sheets.

Figure 3:
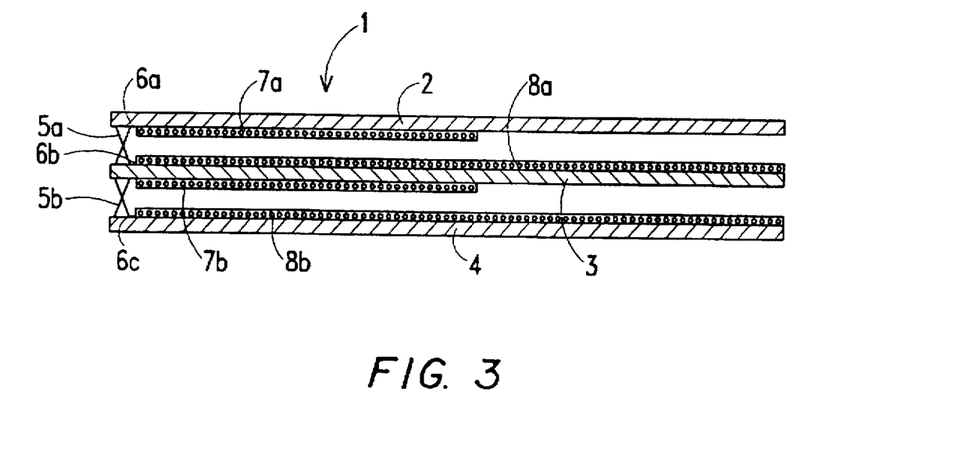
FIG. 3 is a schematic sectional view of a duplicating printing sheet.

FIG. 3 illustrates a sectional schematic representation of a duplicating sheet 1 of paper composed of three sheets of fine papers, i.e. an upper printing sheet of paper 2, a lower printing sheet of paper 4, and an intermediate printing sheet of paper 3. These individual sheets 2, 3, and 4 are stitched together at their ends with an aid of an adhesive 5a, 5b, and can be separated by means of perforations 6a, 6b, 6c provided in the inside of stitching area. A color former layer 7a comprising microcapsule particles 10 filled with a color developing dye 11 and dispersed individually in an oil-based printing varnish 15 is provided by printing on a corresponding duplicating area of the back of the upper printing sheet 2 in the vicinity of the perforation 6a. The surface of the intermediate printing sheet 3 is totally covered with a conventional developer layer 8a, while a color former layer 7b is provided on the back by printing in the corresponding duplicating area, the color former layer 7b comprising the same components as those of color former layer 7a. The surface of the lower printing sheet 4 is totally covered with a developer layer 8b comprising the same component as those of the developer layer 8a. Thus, when letters are printed by means of, for example, a ballpoint pen on the duplicating area, a color reaction takes place on the corresponding developer layers thereof, whereby the same letters are duplicated on the lower and medium sheets at the same time.

Further, it is difficult to visually observe the presence of the coated microcapsule-containing oil-based coating liquid layer on a printing sheet of paper. One of the confirming methods is a method comprising utilizing an acid-base indicator, such as Methyl Red, Tetrabromophenol, or Brom Cresol Green, which induces a color reaction in a pH of the printing substrate of paper. In this case, an indicator diluted with dichloromethane, ethyl alcohol, or propyl alcohol and sealed in a pressurized bomb is used for detecting the presence of the coating by spraying it on a printing sheet of paper, resulting in a change in color on the coating layer.

The invention will be further illustrated in detail but in no way limited by the following examples.

Preparation of microcapsule-containing dispersion A (microcapsules filed with a color developing dye to be used for a carbonless paper):

In 200 parts of an aqueous 5-% (by wt.) styrene/maleic anhydride copolymer (trade name; Scripset-520, Monsant Co.) solution (pH 4.6) containing a small amount of NaOH was dissolved 194 parts of alkylnaphthalene (trade name; KMC-113, Kureha Chem. Ind. Co.) and 6 parts of Crystal Violet Lactone under heating while stirring to provide an emulsion (average particle size; 2 μm).

To the emulsion was added 60 parts of melamine-formaldehyde precondensate (trade name; Sumirez Resin 513, Sumitomo Chemical Co.), thereafter the mixture was stirred at 75° C. for two hours in order to provide a microcapsule-containing dispersion A for carbonless paper use.

Preparation of microcapsule-containing dispersion B (microcapsule filled with a color developing dye for a carbonless paper use):

In 200 parts of an aqueous 7-% (by wt.) styrene/maleic anhydride copolymer (trade name; Scripset-520, Monsant Co.) solution (pH 4.6) containing a small amount of NaOH was dissolved 194 parts of alkylnaphthalene (trade name; KMC-113, Kureha Chem. Ind. Co.) and 6 parts of Crystal Violet Lactone under heating while stirring to provide an emulsion (average particle size; 1.5 μm).

To the emulsion was added 60 parts of melamine-formaldehyde precondensate (trade name; Sumirez Resin 513, Sumitomo Chemical Co.), thereafter the mixture was stirred at 75° C. for two hours in order to provide a microcapsule-containing dispersion B for carbonless paper use.

Preparation of microcapsule-containing dispersion C (microcapsule filled with a temperature indicating agent):

In 250 parts of an aqueous 5-% (by wt.) styrene/maleic anhydride copolymer (trade name; Scripset-520, Monsant Co.) solution (pH 4.6) containing a small amount of NaOH was dissolved 9.5 parts of Crystal Violet Lactone, 9.5 parts bisphenol A, and 231 parts of myristyl alcohol under heating, thereafter added 250 parts of a temperature indicating agent maintained at 50° C. to provide an emulsion (average particle size; 2 μm).

To the emulsion was added 75 parts of melamine-formaldehyde precondensate (trade name; Sumirez Resin 513, Sumitomo Chemical Co.), thereafter the mixture was stirred at 70° C. for two hours in order to provide a the temperature indicating agent core microcapsule-containing dispersion C.

EXAMPLE 1

(a) A 300 ml-closed vessel fitted with a stirrer and connected to a vacuum pump was charged with 80 parts of a 50% (by Wt.) microcapsule-containing dispersion A and 20 parts of glycerine (Wako Pure Chem. Ind. Co.) while stirring.

(b) To the resulting mixture was added 20 parts of a UV-curable oil varnish (trade name; FD Gloss OP Varnish-1, Toyo Ink Mfg. Co.) while stirring.

(c) Water was removed from the mixture at 40° C. in vacuum (about 10 Pa) by maintaining the temperature for one to two hours to provide an oil-based ink (water content; about 10% by weight).

(d) To the oil-based ink was added 30 parts of an adjustor for printing ink use (trade name; FD Reducer OP, Toyo Ink Mfg. Co.) while stirring in order to adapt it for the specific printer to be employed.

(e) A pressure-sensitive spot print having a UV-dried coating layer (dried ink amount; 3 g/m$^2$) was obtained by printing on the back of an upper sheet of foam fine paper (40 Kg of ream weight) and on the back of an intermediate duplicating sheet of paper (40 Kg of ream weight) (trade name; C 40, Fuji Film Co.) by using the oil-based ink thus prepared at a speed of 20 meter/min by a printer, in order to obtain a pressure-sensitive spot print.

EXAMPLE 2

(a) The procedure of Example 1 was followed except that 30 parts of the glycerine was used.

(b)–(e) The procedure of Example 1 was followed except that an oil-based varnish (trade name; Recarton OP vanish No. 6, T&K TOKA Co.), and an adjustor for printing ink use (trade name; UV 161 Reducer, T&K TOKA Co.) were employed, in order to obtain a pressure-sensitive spot print.

EXAMPLE 3

(a) The procedure of Example 1 was followed.

(b)–(e) The procedure of Example 1 was followed except that a mixed oil varnish (viscosity; 100 Pa s/25° C.) |a rosin-modified phenolic resin: petroleum high-boiling solvent (trade name; No. 7 Solvent, Nippon Oil Co.)=4:6] was used in place of the foregoing oil varnish (trade name; FD Gloss OP Varnish-1).

EXAMPLE 4

(a) The procedure of Example 1 was followed except that 35 parts of the glycerine was used.

(b) The procedure of Example 1 was followed except that an oil varnish (trade name; KOP varnish-2, Toyo Ink Mfg. Co.) was used in place of the varnish (trade name; FD Gloss OP varnish-1).

(c)–(e) The procedure of Example 1 was followed except that an adjustor [25 parts of OO Varnish (Toyo Ink Mfg. Co.) mixed with 5 part of a jelly compound (Toyo Ink Mfg. Co.)] was used in place of the adjuster, in order to obtain a pressure-sensitive spot print.

EXAMPLE 5

(a) The procedure of Example 1 was followed except that 30 parts of ethylene glycol (Wako Pure Chem. Ind. Co.) was used in place of the glycerine.

(b) The procedure of Example 1 was followed except that OO Varnish (Toyo Ink Mfg. Co.) was used in place of the oil varnish (trade name; FD Gloss OP Varnish-1).

(c)–(e) The procedure of Example 1 was followed except that an adjustor [25 parts KOP Varnish (Toyo Ink Mfg. Co.) mixed with 5 part of a jelly compound (Toyo Ink Mfg. Co.)] was used in place of the adjuster (trade name; FD Reducer-OP), in order to obtain a pressure-sensitive spot print.

Note: UV drying was not necessary in Examples 4 and 5.

EXAMPLE 6

(a) A 300 ml-closed vessel fitted with a stirrer and connected to a vacuum pump was charged with 80 parts of a 50% (by wt.) microcapsule-containing dispersion B and 20 parts of glycerine (Wako Pure Chem. Ind. Co.) while stirring.

(b)–(e) The procedure of Example 1 was followed to provide a pressure-sensitive spot print.

EXAMPLE 7

(a) A 300 ml-closed vessel fitted with a stirrer and connected to a vacuum pump was charged with 80 parts of a 50% (by wt.) microcapsule-containing dispersion C and 20 parts of glycerine (Wako Pure Chem. Ind. Co.) while stirring.

(b) To the mixture thus obtained was added 20 parts of a resin for coating use (trade name; Alonix M-150, Toa Gosei Chem. Ind. Co.) while stirring.

(c) Water was removed from the mixture at 40° C. in vacuum (about 10 Pa) by maintaining the temperature for one to two hours to provide an oil-based ink (water content; about 10% by weight).

(d) In order to improve the coating performance of the oil-based coating liquid thus obtained in (c), 30 parts of an adjustor for coating use (trade name; Alonix M-101, Toa Gosei Chem. Ind. Co.) was added while stirring.

(e) A mug having a pattern on the surface was coated (10 g/m²) with the oil-based coating liquid, and after which the coating layer was UV-cured to provide a temperature susceptible color developing cup.

EXAMPLE 8

(a) The same as Example 7.

(b) The procedure of Example 7 was followed except that 10 parts of a resin for coating use (trade name; New Frontier R-1200, Daiich Kogyo Seiyaku Co.), 5 parts of a resin for coating use (trade name; New Frontier TMPT, Daiich Kogyo Seiyaku Co.), 1 part of a resin for coating use (trade name; New Frontier PE-400, Daiich Kogyo Seiyaku Co.) and 1 part of a resin for coating use (trade name; Irgacure 651, Ciba-Geigy Co.) were used in place of the resin for coating use (trade name; Alonix M-150, Toa Gosei Chem. Ind. Co.) employed in Example 7.

(c)–(e) The procedure of Example 7 was followed except that 30 parts of an adjustor for coating use (trade name; New Frontier HDDA, Daiich Kogyo Seiyaku Co.) was used in place of the adjustor (trade name; Alonix M-101) employed in Example 7 to provide a temperature susceptible color developing cup.

EXAMPLE 9

(a) The same as Example 7.

(b) The procedure of Example 7 was followed except that 10 parts of a resin for coating use (trade name; New Frontier R-1400, Daiich Kogyo Seiyaku Co.), 10 parts of a resin for coating use (trade name; New Frontier C9A, Daiich Kogyo Seiyaku Co.), 1 part of a resin for coating use (trade name; Irgacure 184, Ciba-Geigy Co.) were used in place of the resin for coating use (trade name; Alonix M-150) to provide a temperature susceptible color developing cup.

(c)–(e) The procedure of Example 7 was followed except that 30 parts of an adjustor for coating use (trade name; New Frontier CEA, Daiich Kogyo Seiyaku Co.) was used in place of the adjustor (trade name; Alonix M-101) employed in Example 7 to provide a temperature susceptible cup.

EXAMPLE 10

(a) The same as Example 7.

(b) The procedure of Example 7 was followed except that 20 parts of a resin for coating use (trade name; E-4, T&K TOKA Co.) was used in place of the resin for coating use (trade name; Alonix M-150) in Example 7.

(c)–(e) The procedure of Example 7 was followed except that 25 parts of an adjuster for coating use (trade name; Silver Varnish, T&K TOKA Co.) and 5 parts of an adjustor for coating use (trade name; Reducer, T&K TOKA Co.) was used in place of the adjuster for coating use (trade name; Alonix M-101) in Example 7 to provide a temperature susceptible color developing cup.

EXAMPLE 11

(a) The procedure of Example 7 was followed except that 30 parts of ethylene glycol (Wako Pure Chem. Ind. Co.) was used in place of 20 parts of glycerine (Wako Pure Chem. Ind. Co.) employed in Example 7.

(b) The procedure of Example 7 was followed except that 15 parts of a resin for coating use (trade name; Corponeal PA-24T, Showa Polymer Co.) and 10 parts xylene (Wako Pure Chem. Ind. Co.) were used in place of the resin for coating use (trade name; Alonix M-150) employed in Example 7.

(c)–(e) The procedure of Example 7 was followed except that 25 parts of xylene (Wako Pure Chem. Ind. Co.), 10 parts of MIBK (Wako Pure Chem. Ind. Co.) and butyl acetate (Wako Pure Chem. Ind. Co.) were used in place of the adjustor for coating use (trade name; Alonix M-101) employed in Example 7 to provide a temperature susceptible color developing cup.

Note: UV-drying was not necessary in Example 11.

COMPARATIVE EXAMPLE 1

(a) The microcapsule-containing dispersion A was spray-dried to provide microcapsule powder.

(b) To 40 parts of the powder was added 80 parts of an oil-based varnish (trade name; FD Gloss OP Varnish-1, Toyo Ink Mfg. Co.).

(c) To the varnish thus obtained was added 30 parts of an adjustor for printing ink use (trade name; FD Reducer OP, Toyo Ink Mfg. Co.) while stirring.

(d) The procedure of Example 1(e) was followed to provide a pressure-sensitive spot print.

COMPARATIVE EXAMPLE 2

(a) The microcapsule-containing dispersion B was spray-dried to provide microcapsule powder.

(b) To 40 parts of the powder was added 80 parts of a resin for coating use (trade name; Alonix M-150, Toa Gosei Chem. Ind. Co.) while stirring.

(c) To the mixture thus obtained was added 30 parts of an adjuster for coating use (trade name; Alonix M-101, Toa Gosei Chemical Co.) while stirring.

(d) The procedure of Example 7(e) was followed to provide a temperature susceptible color developing cup.

The values (Table 1) stated in the Examples 1 to 6 and Comparative Example 1 were determined as follows:

1. Evaluation of coloring on the pressure-sensitive spot print:

A. Coloring test by a forcer: Typing was conducted under a medium pressure. The value was determined by measuring color developed concentrations of printed letters on a five individual parts of the carbonless paper stacked on top of each other. The stated values are based on five individual measurements.

B. Coloring test by calendaring roll: A carbonless paper composed of two parts were pressed by calendaring rolls (nip pressure: 1 Kg/inch), and the color developed concentrations were measured. The color developed concentrations stated in Table 1 are relative values to those (as 100) obtained in Comparative Example 1. The higher the value, the higher the color developed concentration.

2. Evaluation of microcapsule breakdown rate for a pressure-sensitive spot print:

A. The value was determined by measuring the amount of free oil spilled from microcapsules by means of a high-pressure liquid chromatography at 70° C. after the free oil was extracted by THF (tetrahydrofuran).

B. The values were determined by measuring coloring concentrations of a developer-coated printing sheet at 80° C. seven days after it was spot printed.

TABLE 1

Tests for a pressure-sensitive spot print

| | Evaluation of Coloring | | Evaluation of Microcapsule Breakdown Rate (%) | |
|---|---|---|---|---|
| | Test 1-A | Test 1-B | Test 2-A | Test 2-B |
| Example 1 | 135 | 130 | 0 | 0 |
| Example 2 | 145 | 135 | 0 | 0 |
| Example 3 | 150 | 140 | 0 | 0 |
| Example 4 | 145 | 140 | 0 | 0 |
| Example 5 | 145 | 135 | 0 | 0 |
| Example 6 | 130 | 130 | 0 | 0 |
| Comparative Example 1 | 100 | 100 | 30 | 20 |

The following comparative evaluation was conducted for Examples 7 to 11 and Comparative Example 2. Table 2 shows the results.

A. Evaluation of color fading: The appearance of preprinted patterns under the coating was observed visually after water (50° C.) was poured into the cup.
B. Evaluation of coloring: The disappearance of preprinted patterns under the coating was observed visually, after water (20° C.) was poured into the cup instead of water (50° C.).
C. Evaluation of appearance of coated surface: The evenness and gloss of the coated surface was observed visually.

TABLE 2

Evaluation of the Coated Surface of a Mug

| | Color Fading | Coloring | Appearance |
|---|---|---|---|
| Example 7 | Uniform fading speed, Completely appeared pattern | Uniform coloring speed, Completely covered pattern | Good evenness and gloss |
| Example 8 | Uniform fading speed, good fading, clearly appeared pattern | Uniform coloring speed, Completely covered pattern | Good evenness and gloss |
| Example 9 | Uniform fading speed, good fading, clearly appeared pattern | Uniform coloring speed, Completely covered pattern | Good evenness and gloss |
| Example 10 | Uniform fading speed, good fading, clearly appeared pattern | Uniform coloring speed, Completely covered pattern | Good evenness and gloss |
| Example 11 | Uniform fading speed, good fading, clearly appeared pattern | Uniform coloring speed, Completely covered pattern | Good evenness and gloss |
| Comparative Example 2 | Uneven fading speed, insufficiently appeared pattern | Covered patter, lack of uniformity in coloring speed | Rough surface with no gloss |

The individual average particle sizes of the microcapsules in the oil-based coating liquids obtained in Examples 1 to 11 were almost the same as those of microcapsules containing in the corresponding water-based dispersions, and the flexibility or strength of the microcapsule wall materials was equivalent to those of the original.

In contrast to the foregoing, microcapsules obtained in Comparative Examples 1 and 2 formed secondary particles through coagulation, and their average particle sizes increased to about 30 μm (max. 100 μm). In addition, the microcapsule wall material became brittle through hardening at the drying temperature.

As for the yields of microcapsules obtained in Examples 1 to 11, the individual values were all 100%, while in both Comparative Examples 1 and 2 the values were about 70%, showing that a substantial amount was lost upon spray-drying.

EXAMPLE 12

In a 300 ml-closed vessel fitted with a stirrer and connected to a vacuum pump, 200 parts of an aqueous 5-% (by wt.) styrene/maleic anhydride copolymer solution (pH;4.6) containing a small amount of NaOH was prepared, and 200 parts of a perfume solution was added under heating while stirring to provide an emulsion (average particle size; 2 μm).

To the emulsion was added 60 parts of a melamine/formaldehyde precondensate while stirring at 75° C. for two hours. 80 parts of the 50-% (by wt.) microcapsule-containing dispersion thus obtained were mixed with 20 parts of glycerine while stirring. The procedure of Example 1 was followed except that 20 parts of an oxidative polymerization-type oil varnish was used in place of 20 parts of the UV-curable-type oil varnish in Example 1 to provide a microcapsule-containing oil ink, the microcapsules being filled with perfume.

The surface of a sheet substrate of synthetic paper was printed with the ink (2 g/m², dry base) thus obtained at a printing speed of 500 ft./min by a letterpress offset rotary printing machine to provide a post card having a coating layer containing the perfumed microcapsule-containing ink.

Figure 4:
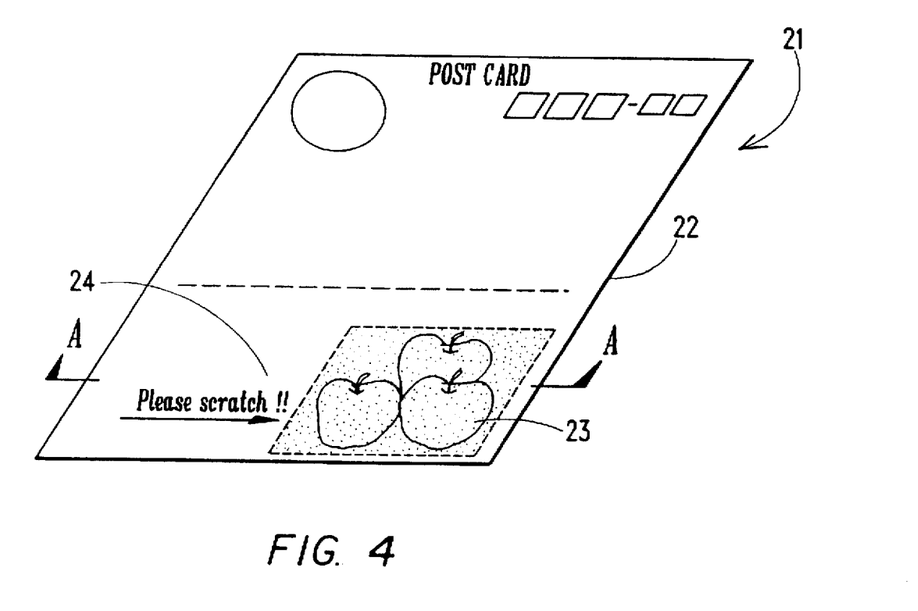
FIG. 4 is a perspective diagram of a perfumed post card which is one of the embodiments of the present invention.
Figure 5:
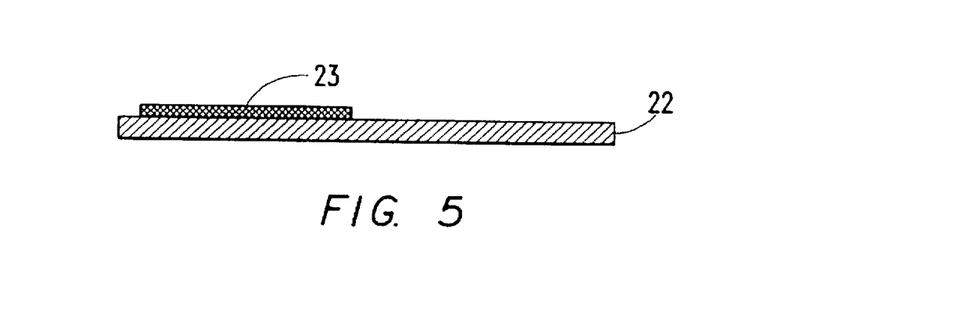
FIG. 5 is a schematic sectional view taken on line A—A of FIG. 4.

As shown in FIGS. 4 and 5, the perfumed post card according to the present invention 21 is composed of a sheet of synthetic paper 22, a coating layer 23 comprising microcapsule-containing oil-based ink, the microcapsules being filled with perfume as the core material of the microcapsules, and a prescribed printing 24.

EXAMPLE 13

In a 300 ml-closed vessel fitted with a stirrer and connected to a vacuum pump, 200 parts of an aqueous 5-% (by wt.) styrene/maleic anhydride copolymer solution (pH 4.6) containing a small amount of NaOH was prepared, and 200 parts of a temperature indicating agent solution was added under heating while stirring to provide an emulsion (average particle size; 2 μm).

To the emulsion was added 60 parts of a melamine/formaldehyde precondensate while stirring at 75° C. for two hours. 80 parts of the 50-% (by wt.) microcapsule-containing dispersion thus obtained were mixed with 20 parts of glycerine while stirring. The procedure of Example 1 was followed to provide a microcapsule-containing oil-based ink, the microcapsules being filled with the temperature indicating agent as the core material of the microcapsules.

The surface of a sheet substrate of plastic was printed (3 g/m², dry base) with the ink thus obtained at a printing speed of 300 ft./min. by a lithographic offset rotary printing machine and a UV-dryer to provide a temperature-sensitive ID card having a coating layer comprising a microcapsule-containing oil-based ink, the microcapsules being filled with the temperature indicating agent as the core material of the microcapsules.

Figure 6:
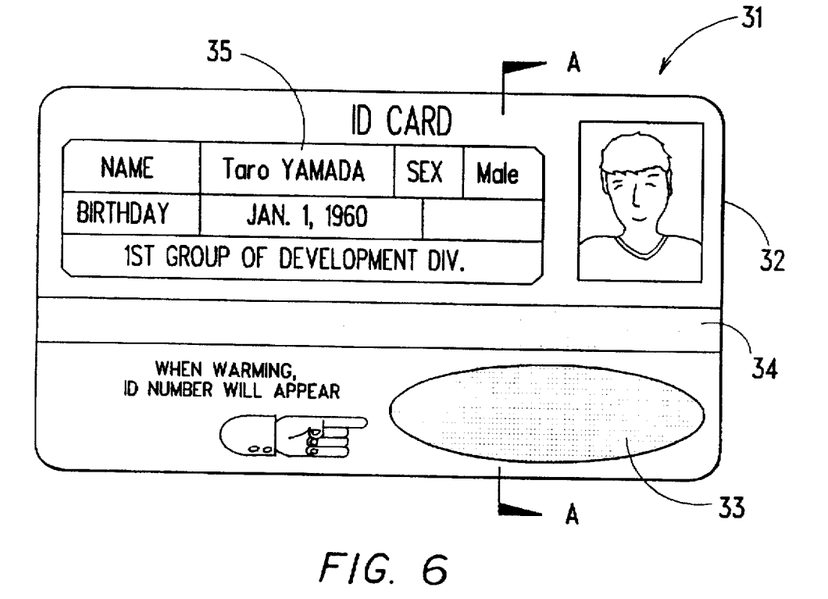
FIG. 6 is a perspective view of a temperature indicating ID card which is one of the embodiments of the present invention.
Figure 7:
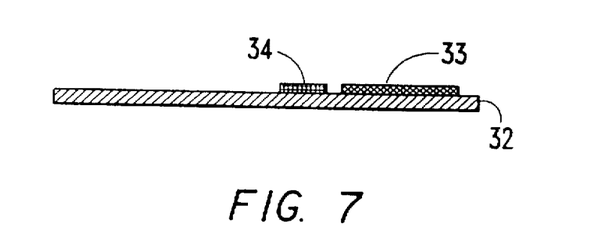
FIG. 7 is a schematic sectional view taken on line A—A of FIG. 6.

FIGS. 6 and 7 show the resulting ID cards. The temperature indicating ID card 31 according to the present invention comprises a sheet of plastic 32 and a coating layer 33 comprising a microcapsule-containing oil-based ink, the microcapsules being filled with a temperature indicating agent as the core material of the microcapsules, a magnetic tape 34 and a prescribed print 35.

(Effect of the invention)

According to a method of the present invention, it is possible to convert a microcapsule-containing water-based dispersion into a microcapsule-containing oil-based system without impairing the strength and flexibility of the microcapsule wall material in a state of primarily microcapsule particles intact; therefore, many of the problems associated with conventional processes, such as coagulation of microcapsules, breakdown of microcapsules, low yield of product, or high investment costs can be circumvented by using the method according to the present invention.

Particularly in printing field, the oil-based ink according to the present invention can be used by a conventional printing process, regardless of the kind of printing paper employed, without the use of a desensitizer which has hitherto been used for partial prevention of coloring. Both UV-curable and oxidative-polymerization-type inks may be prepared. In addition, when printed onto a surface of a sheet of paper, the printing ink according to the present invention does not penetrate the fibrous matrix, and any color-forming dye encapsulated does not transfer to a developer-coated sheet of paper. Further, the microcapsules according to the present invention are surrounded and fixed with an ink material; therefore, there is no need to use any protective agents, and more distinctive coloring takes place.

The microcapsule-containing oil-based ink according to the present invention can be prepared by converting a microcapsule-containing water-based system, which contains an objective hydrophobic material as the core material of the microcapsules, into a microcapsule-containing oil-based printing vehicle system without impairing the original strength and flexibility of the microcapsule wall material. Thus, the ink composition according to the invention can be handled similarly to the conventional oil-based printing ink such as UV-curable-type and oxidative-polymerization-type printing inks; therefore, the coating layer paralleled selectively to a prescribed print may be formed freely on a specific area of various kinds of sheets by a conventional pressure transferring-type printing machine.

What is claimed is:

1. A sheet printed in a selected area with a microcapsule containing non-aqueous ink comprising microcapsule particles filled with a hydrophobic material and individually dispersed in an oil varnish for ink use or a resin for coating use, and a solvent which has an affinity for both the varnish or the resin and the surface layer of the microcapsule wall material in a state of having been attracted to both the varnish or the resin and the surface layer of the microcapsule wall material, said microcapsule particles prepared by mixing a microcapsule-containing aqueous dispersion with said oil varnish or said resin and said solvent, and removing the water in the mixture by distillation in vacuum to convert said microcapsules in said aqueous system into said microcapsules in said non-aqueous system in a state of individually dispersed microcapsule particles intact.

2. A sheet claimed in claim 1, wherein said hydrophobic material is selected from the group consisting of dye, pigment, perfume, liquid crystal, a chemical agent, a solvent, a plasticizer, a temperature indicating agent, and an adhesive.

3. A sheet claimed in claim 2, wherein said hydrophobic material is dye.

4. A sheet claimed in claim 1, wherein said hydrophobic material is color developing dye and the sheet is used as a pressure-sensitive duplicating sheet.

* * * * *